May 19, 1970 W. ASLAN 3,512,422
ROTARY ACTUATOR
Filed May 31, 1968 2 Sheets-Sheet 1
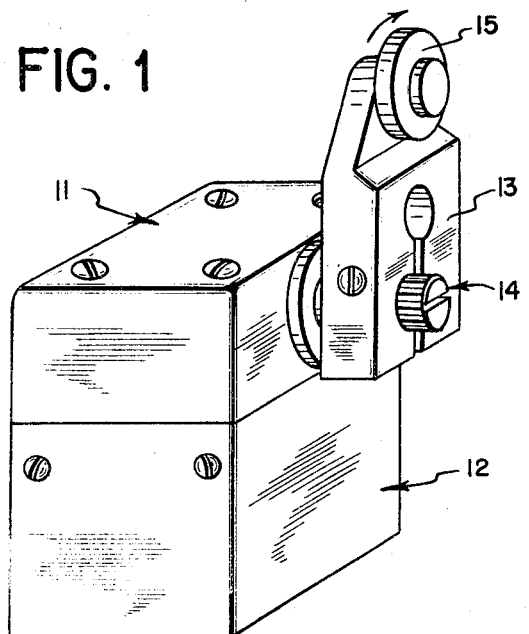
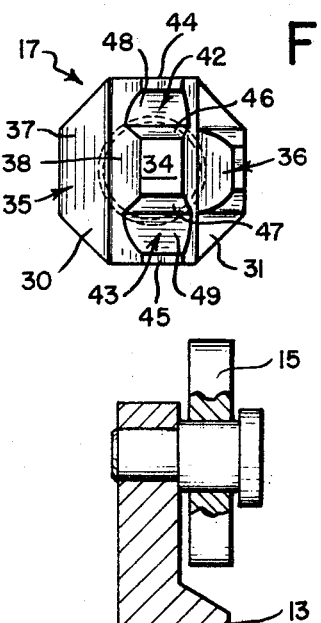
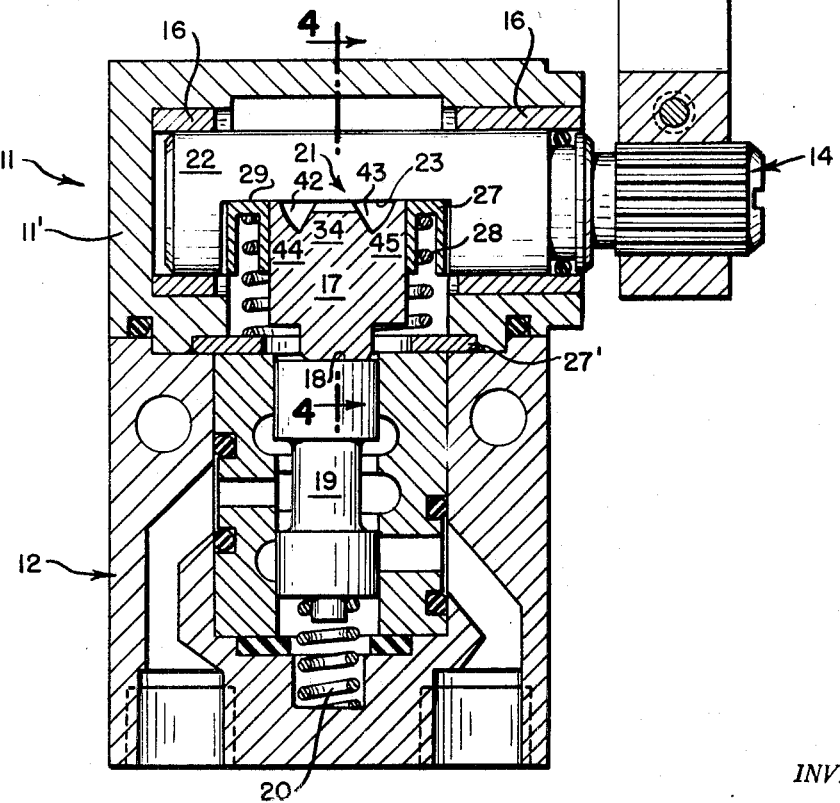
INVENTOR.
Wilfred Aslan
BY
ATTORNEYS

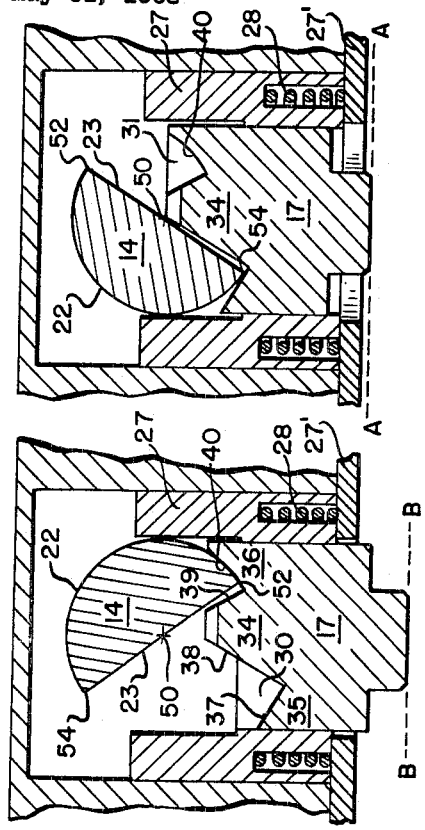
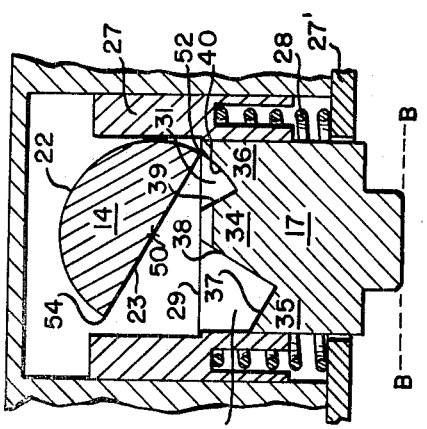
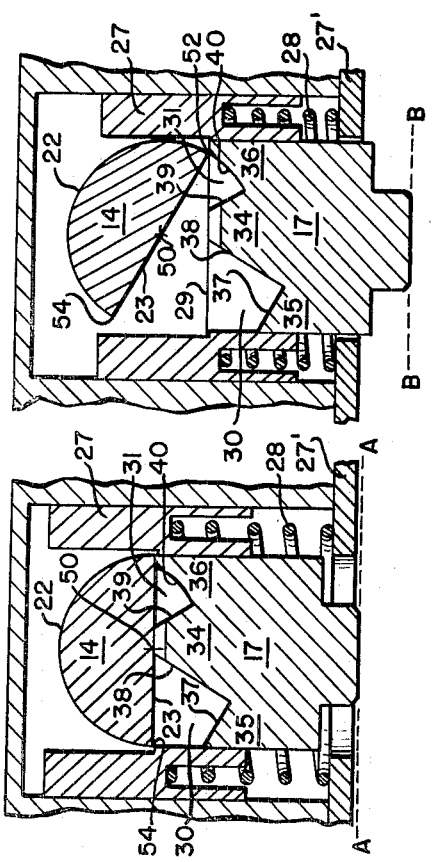
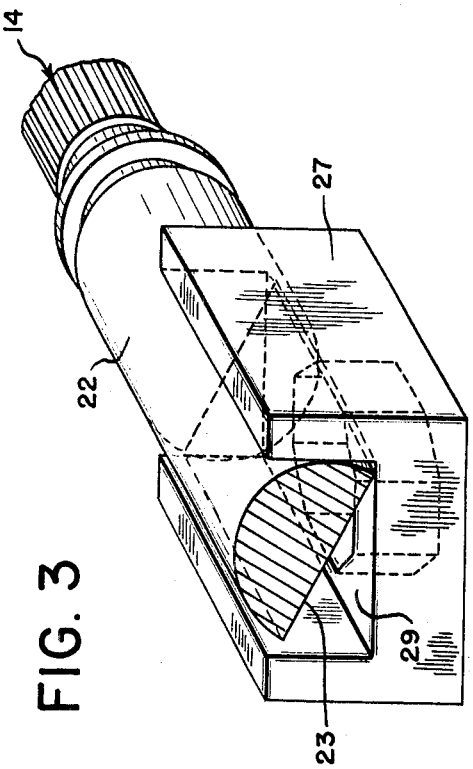
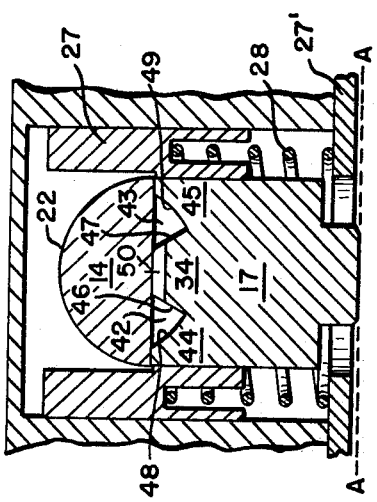

United States Patent Office 3,512,422
Patented May 19, 1970

3,512,422
ROTARY ACTUATOR
Wilfred Aslan, Mahwah, N.J., assignor to Alkon Products Corporation, Wayne, N.J., a corporation of New York
Filed May 31, 1968, Ser. No. 733,577
Int. Cl. F16h 25/06
U.S. Cl. 74—107
9 Claims

ABSTRACT OF THE DISCLOSURE

A rotary actuator for producing linear output motion of an output member to actuate associated apparatus such as a limit switch or valve, the actuator including an actuator shaft having a drive surface rotatable between rest, actuated and overtravel positions, and a slidable output member engageable by the drive surface of the shaft and having at least one driven surface cooperating with the shaft's drive surface to produce linear motion of the slidable output member.

BACKGROUND OF THE INVENTION

Field of the invention

This invention relates to rotary actuators and more particularly to devices for converting a rotary input motion into a linear output motion for operating apparatus such as limit switches.

Description of the prior art

Rotary actuators of the type presently available are commonly used for providing a linear motion to actuate associated apparatus such as limit switches and limit valves. A typical actuator has a crank or other lever for rotating a shaft, and an output member driven by the shaft with linear output movement. The output member engages and drives an element of the associated apparatus.

It is recognized, however, that presently constructed actuators of this design possess certain disadvantages as far as their operating characteristics and construction are concerned. Generally, the operation of any particular actuator is limited to producing a specific output motion. For example, the actuator plunger will be limited to moving a specific linear distance. Thus, if the associated apparatus, such as a limit valve, to be actuated by the actuator has a number of modes of operation requiring different amounts of linear movement of its control member, the piston of a limit valve, specifically designed actuators will be required for producing each type of operation. Also, in some situations, it may be desirable to position the actuator so that its crank which is used for effecting rotation of the actuator shaft be operable upon rotation in, for example, a clockwise direction. In other situations, counterclockwise rotation of the crank may be required. Actuators operable in either the clockwise, counterclockwise or both directions are available; however, in construction, these devices are rather complicated and require separate cam members and provision for mounting these cam members in different orientations with respect to the actuator shaft and output member of the actuator to obtain the desired operation.

Summary of the invention

The actuator constructed in accordance with the teachings of the present invention avoids the disadvantages encountered with prior actuators, is simpler and less expensive in construction and more versatile in operation. Generally, the actuator includes a rotatable actuator shaft and a single output plunger member mounted in sliding cooperative relationship in a housing. The shaft has at least one drive surface and is rotatable between rest, actuated, and overtravel positions while the output member is selectively mountable in at least two different orientations with respect to the shaft. In the first orientation of the output member, it presents a first driven surface opposing the drive surface of the shaft whereby upon rotation of the actuator shaft from rest to actuated positions, the output member will be caused to move a first predetermined distance through its operating stroke. In the second orientation of the output member, a second drive surface different from the first will cooperatively oppose the drive surface of the actuator shaft whereby upon actuation of the actuator shaft from its rest to actuated position, the output member will be caused to move a second predetermined distance different from the first predetermined distance. Also, the driven surfaces of the output member are constructed so that the actuator may be selectively positioned in different orientations with respect to the actuator shaft to cause movement thereof in response to movement of the actuator shaft in either the clockwise, counterclockwise or both directions.

As indicated above, the actuator shaft is adapted to move between rest, actuated and overtravel positions. Movement between the first two positions causes actuation of the output member. The overtravel position is provided for movement of the actuator shaft beyond the actuated position without causing further movement of the output member. Also, in the construction where the output member is actuated in response to only clockwise or counterclockwise movement of the actuator shaft, the actuator shaft may be rotated in the nonactuating direction without causing any movement of the output member. This overtravel of the actuator shaft eliminates the possibility of strain or breakage of the various cooperating members, which might otherwise occur; and is additionally important in assuring smooth operation of the actuator especially when used in plant locations where it may be subjected to imprecise mounting, rough operation, and variable or erratic input motion to the crank.

Brief description of the drawings

FIG. 1 is a perspective view of a rotary actuator according to the present invention;

FIG. 2 is a sectional view of the actuator shown in FIG. 1;

FIG. 3 is a partial perspective view of the actuator shaft and support for the output plunger;

FIG. 4 is a partial sectional view taken along line 4—4 of FIG. 2 showing the shaft and plunger in their respective rest positions;

FIG. 5 is similar to FIG. 4 with the shaft and plunger in actuated positions;

FIG. 6 is similar to FIG. 5 with the plunger in actuated position and the shaft rotated to its overtravel position;

FIG. 7 is similar to FIG. 6 with the shaft rotated counterclockwise into a reverse overtravel position;

FIG. 8 is a partial sectional view similar to FIG. 4 with the plunger oriented 90° about its axis, and the shaft and plunger in their rest positions; and FIG. 9 is a plane view of the plunger.

Description of the preferred embodiment

FIGS. 1 and 2 show the preferred construction of the rotary actuator 11 of this invention as assembled to a pneumatic valve 12. The actuator includes a housing 11', an external crank 13 and an actuator shaft 14 for operating the actuator as more fully described below. The round roller 15 at the end of the crank is contacted by an external moving element (not shown) which drives the crank 13 in either a clockwise direction as indicated by the arrow or in a counterclockwise direction. A variety of roller shapes and accessories may be used in place of roller 15; however, in all cases the crank is driven to rotate the shaft 14.

FIG. 2 shows the internal portions of the actuator as including bearings 16 in which the shaft 14 is rotatably mounted with the crank 13 secured to an extending part of shaft 14 by a set screw. Rotation of shaft 14 drives an actuator output member in the form of a plunger 17 downwardly against the top surface 18 of the piston 19 of the pneumatic valve which thus descends in opposition to a spring 20. The rate and extent of the piston's descent with respect to rotation of the actuator shaft is determined by the upper driven surface contours 21 of plunger 17 as they cooperate with neutral and drive surfaces 22 and 23 provided on the shaft 14. The relationship of these surfaces is more specifically shown in FIGS. 4–8 which represent cross-sectional view of the shaft 14 and plunger 17 in various positions of rest, actuation and overtravel.

Although the actuator of the present invention is shown in FIGS. 1 and 2 as assembled to a valve having fluid ports, the opening and closing of which are controlled by the piston 19, the actuator of the present invention is equally well suited for controlling a linear moving element of an electric limit switch or other comparable device.

As seen in FIGS. 2 and 3, shaft 14 of the actuator is a generally round cylindrical member and has a half-round portion intermediate its ends defining its round neutral and flat drive surfaces 22 and 23. Below the shaft and surrounding the plunger is a support 27 for the plunger and a coil spring 28 biasing the support in an upward direction. The flat upper surface 29 of the support is at all times urged against the flat bottom drive surface 23 of the shaft which is thereby biased to a horizontal rest position shown in FIGS. 2 and 4. The support has a hexagonal opening, as shown in FIG. 3, for slidably receiving the plunger 17 which has a complementary outer shape. The plunger may be removed from the assembly, rotated 90° about its axis of sliding movement and reinserted such that it is again able to move vertically; but in either position, it is restrained against rotation.

In FIG. 4, the upper surface of the plunger 17 is shown with a deep indentation or channel 30 of the left side and a smaller indentation or channel 31 on the right side. These same indented contours appear in FIGS. 5–7. The cross-sectional views of the plunger as shown in FIGS. 4–7 are taken along line 4—4 of FIG. 2. As shown in these figures and in FIG. 9, channel 30 on the left side and cahnnel 31 on the right extend horizontally, completely across the top of the plunger. These two channels define neutral surfaces and form a central tooth 34 on the upper surface of the plunger which is spaced between marginal teeth 35 and 36. It should be noted here that channel 30 is defined by wall 37 of tooth 35 and wall 38 of tooth 34, and that these walls are flat surfaces. Similarly, channel 31 is defined by one straight wall 39 of tooth 34 and a curved wall 40 of tooth 36, the curved wall 40 being a circular arc having a constant radius equal to the radius of shaft 14.

FIG. 8, which is a cross-sectional view similar to FIG. 4 with the plunger oriented at 90° with respect to its position in FIG. 4, shows the plunger's second driven surface which is different from the driven surface shown in FIG. 4. Here, channel 42 is formed by straight and curved walls 46 and 48, and channel 43 is similar wth straight and curved walls 47 and 49. These channels 42 and 43 define the neutral surfaces of the plunger when oriented in the positions shown in FIG. 8. From FIG. 9, it is apparent that channels 42 and 43 extend across the top surface of the plunger transverse to channels 30 and 31 to form teeth 44 and 45. Whether the channels forming these teeth are cut or molded, the resulting center tooth 34 is defined by the four surrounding channels. This tooth has a generally rectangular shape in plan view and extends downward as a pyramid.

As indicated earlier, the rate and extent of the plunger's descent in its motion pattern depend upon the shapes of the cooperating surfaces of the shaft and plunger, and this interrelationship is shown in FIGS. 4–8. In FIG. 4, the shaft 14 and plunger 17 are in their respective rest positions, and they tend to remain in these positions due to coil spring 20 acting upon the piston and spring 28 acting upon the support 27.

In FIG. 4, the plunger in its rest position has its lower surface at a level indicated by the dotted line A—A. FIG. 5 shows that the plunger has descended to the new level B—B as a result of the shaft's partial clockwise rotation. In FIG. 6, the plunger is shown to remain at level B—B even though the shaft has continued to rotate in the clockwise direction. FIG. 7 shows the plunger to be at its initial level A—A even though the shaft has been rotated in a counterclockwise direction.

When the shaft is rotated in a clockwise direction, the edge 52 of its drive surface 23 bears against the top surface of plunger tooth 36. Since the shaft rotates about a fixed center point, and edge 52 of the drive surface is at a fixed distance from this center point, this edge must necessarily move downward. In so moving the edge drives the plunger downward to its first actuated position B—B shown in FIG. 5. At this point, the neutral surface 40 of the plunger will have moved out of the path of movement of the edge 52 of the drive surface 23 of the actuator shaft. Thus, with further rotation of the shaft, the edge 52 begins to descend into channel 31, and since the arcuate neutral surface 22 of the shaft conforms to arcuate neutral surface 40 of the plunger into which it descends, there will be no further downward motion of the plunger. The additional rotary motion of the shaft as shown in FIG. 6 represents overtravel of the shaft, i.e, continued rotation of the shaft without further corresponding descent of the plunger past that shown in FIG. 5. This overtravel continues until the support 27 abuts against a stop washer 27' secured to the lower end of the actuator. At this point, the surface 23 will be slightly spaced from the surface 39 of the plunger and further rotation of the shaft will be prevented.

This provision for overriding or overtravel of the actuator shaft eliminates the need for precision setting of the mechanism that strikes the actuator shaft and assures actuation of the valve or other device to which the actuator is connected after a predetermined degree of rotation of the actuator shaft.

Returning to FIG. 4, if shaft 14 is rotated in a counterclockwise direction, the construction of the channel 30 prevents the plunger from moving in a downward direction since no portion of the plunger is in the path of the descending edge 54 of the drive surface of the shaft. As the shaft rotates, it effectively pivots about point 50 until its edge 54 has moved to the lowest position shown in FIG. 7 where the edge has almost fully descended into channel 30. At this point, the support 27 will have come into abutment with the stop washer 27' preventing further rotation of the shaft. This counterclockwise overtravel movement of the shaft permits a counterclockwise input motion to the crank without actuating the valve 12. Thus, the shaft may be rotated in a counterclockwise, return direction after rotation in the clockwise actuating direction without precise control.

In FIG. 8, the plunger is shown oriented 90° about its vertical axis and in its rest position at an initial level A—A. The teeth 44 and 45 shown in FIG. 8 are wider than the teeth 35 and 36 shown in FIG. 4 while the arc of the curved walls 48 and 49 of the channels 42 and 43 have the same radius as the arc of the curved wall 40 of the channel 31. Consequently, with the orientation of the output plunger as shown in FIG. 8, rotation of the actuator shaft 14 in either a clockwise or counterclockwise direction will drive the plunger to a level somewhat lower than level B—B shown in FIG. 5. In addition, rotation of the actuator shaft past the point where the drive surface of the shaft disengages from the associated tooth or driven surface of the plunger will produce no further movement of the plunger.

The above description of the present invention has been made with reference to the presently preferred embodiment thereof; however, it is to be understood that various changes may be made thereto without departing from the scope of the invention as set forth in the following claims.

What is claimed is:
1. A rotary actuator comprising:
  (a) a housing;
  (b) an actuator shaft mounted in said housing for rotation between rest, actuated and overtravel positions and having at least one drive surface defined by a non-circular cross-sectional portion of said shaft;
  (c) an output member mounted in said housing for sliding movement in a direction perpendicular to the axis of rotation of said actuator shaft between rest and actuated positions in response to rotation of said actuator shaft between rest and actuated positions, said output member having at least one driven surface disposed in the path of rotary movement of the drive surface of said actuator shaft and terminating in a neutral surface which is disposed out of the path of movement of the drive surface of said actuator shaft when said output member has moved to said actuated position whereby movement of said output member is non-responsive to rotation of the drive surface of said actuator shaft from said actuated position to said overtravel position; and
  (d) means for holding said output member in its actuated position as said actuator shaft is moved from said actuated position to said overtravel position.

2. A rotary actuator according to claim 1 wherein said output member:
  (a) is selectively positionable in different orientations about its axis of movement; and
  (b) includes separate driven and neutral surfaces disposed in cooperative relationship with the drive surface of said actuator shaft when said output member is disposed in each of said different orientations.

3. A rotary actuator comprising:
  (a) a housing;
  (b) an actuator shaft mounted in said housing for rotation between rest, actuated and overtravel positions and having at least one drive surface defined by a non-circular cross-sectional portion of said shaft;
  (c) an output member mounted in said housing for sliding movement in a direction perpendicular to the axis of rotation of said actuator shaft between rest and actuated positions in response to rotation of said actuator shaft between rest and actuated positions, said output member having at least one driven surface disposed in the path of rotary movement of the drive surface of said actuator shaft and terminating in a neutral surface, said neutral surface facing rearwardly of the direction of movement of said output member from said rest position to said actuated position and disposed out of the path of movement of the drive surface of said actuator shaft when said output member has moved to said actuated position whereby movement of said output member is non-responsive to rotation of the drive surface of said actuator shaft from said actuated position to said overtravel position; and
  (d) a neutral surface on said actuator shaft engageable with the neutral surface of said output member during rotation of said actuator shaft between actuated and overtravel positions, said neutral surfaces both being arcuate in shape and having the same constant radius of curvature as measured from the axis of rotation of said actuator shaft.

4. A rotary actuator according to claim 3 further comprising:
  (a) a support for the output member slidably mounted for movement in the same direction as said output member, said support having an opening therethrough for slidably receiving said output member for movement between said rest and actuated positions and having a driven surface engaging the drive surface of said actuator shaft during rotation thereof between rest, actuated and overtravel positions whereby rotation of said actuator shaft from said actuated position to said overtravel position causes sliding movement of said support relative to said output member; and
  (b) stop means disposed in the path of movement of said support for limiting overtravel of said actuator shaft.

5. A rotary actuator according to claim 4 further comprising:
  (a) spring means normally urging said actuator shaft and output member to said rest position.

6. A rotary actuator according to claim 5 wherein:
  (a) the drive surface of said actuator shaft comprises a flat surface extending through the axis of rotation of said actuator shaft; and
  (b) the neutral surface of said actuator shaft defines a part of a cylindrical surface.

7. A rotary actuator according to claim 6 wherein:
  (a) said output member includes a first driven surface engageable with the drive surface of said actuator shaft when rotated in one direction; and
  (b) a second driven surface engageable with the drive surface of said actuator shaft when rotated in the opposite direction.

8. A rotary actuator according to claim 7 wherein said output member:
  (a) is selectively positionable in said support member in different orientations about its axis of movement.

9. A rotary actuator comprising:
  (a) a housing;
  (b) an actuator shaft mounted in said housing for rotation between rest, actuated and overtravel positions and having at least one drive surface defined by a non-circular cross-sectional portion of said shaft;
  (c) an output member mounted in said housing for sliding movement in a direction perpendicular to the axis of rotation of said actuator shaft between rest and actuated positions in response to rotation of said actuator shaft between rest and actuated positions, said output member having at least one driven surface disposed in the path of rotary movement of the drive surface of said actuator shaft and terminating in a neutral surface which is disposed out of the path of movement of the drive surface of said actuator shaft when said output member has moved to said actuated position whereby movement of said output member is non-responsive to rotation of the drive surface of said actuator shaft from said actuated position to said overtravel position;

(d) a support for the output member slidably mounted for movement in the same direction as said output member, said support having an opening therethrough for slidably receiving said output member for movement between said rest and actuated positions and having a driven surface engaging the drive surface of said actuator shaft during rotation thereof between rest, actuated and overtravel positions whereby rotation of said actuator shaft from said actuated position to said overtravel position causes sliding movement of said support relative to said output member; and (e) stop means disposed in the path of movement of said support for limiting overtravel of said actuator shaft.

References Cited

UNITED STATES PATENTS

| | | | |
|---|---|---|---|
| 195,638 | 9/1877 | Nichols | 74—437 |
| 3,390,921 | 7/1968 | Klimek | 74—107 |

FRED C. MATTERN, Jr., Primary Examiner

W. S. RATLIFF, Jr., Assistant Examiner

U.S. Cl. X.R.

74—437